(12) United States Patent
Iwata

(10) Patent No.: US 9,004,445 B2
(45) Date of Patent: Apr. 14, 2015

(54) SOLENOID ACTUATOR

(71) Applicant: Denso Corporation, Kariya, Aichi-pref. (JP)

(72) Inventor: Yoshifumi Iwata, Ichinomiya (JP)

(73) Assignee: Denso Corporation, Kariya (JP)

( * ) Notice: Subject to any disclaimer, the term of this patent is extended or adjusted under 35 U.S.C. 154(b) by 74 days.

(21) Appl. No.: 13/741,720

(22) Filed: Jan. 15, 2013

(65) Prior Publication Data
US 2013/0181151 A1 Jul. 18, 2013

(30) Foreign Application Priority Data

Jan. 16, 2012 (JP) .................................... 2012-6264
Nov. 5, 2012 (JP) ................................ 2012-243912

(51) Int. Cl.
| F16K 31/02 | (2006.01) |
| H02K 33/00 | (2006.01) |
| F16K 31/06 | (2006.01) |
| H01F 7/16  | (2006.01) |

(52) U.S. Cl.
CPC ............ *H02K 33/00* (2013.01); *F16K 31/0675* (2013.01); *H01F 7/1607* (2013.01)

(58) Field of Classification Search
USPC ............. 251/129.15, 148, 322, 323; 285/345, 285/346
See application file for complete search history.

(56) References Cited

U.S. PATENT DOCUMENTS

| 4,725,041 A | * | 2/1988 | Chauvin et al. .......... 251/129.15 |
| 4,905,961 A | * | 3/1990 | Ichihashi et al. ......... 251/129.15 |
| 6,047,947 A | * | 4/2000 | Kumar ..................... 251/129.16 |
| 6,142,445 A | * | 11/2000 | Kawaguchi et al. ..... 251/129.15 |
| 6,463,951 B2 | * | 10/2002 | Shost ......................... 137/15.18 |
| 6,679,475 B2 | * | 1/2004 | Rembold et al. ......... 251/129.14 |
| 6,830,232 B2 | * | 12/2004 | Burrola et al. .................. 251/64 |
| 7,036,788 B1 | * | 5/2006 | Schneider et al. .............. 251/86 |
| 7,128,304 B2 | * | 10/2006 | Morisawa et al. ....... 251/129.18 |
| 7,552,908 B2 | * | 6/2009 | Mitsumata et al. ...... 251/129.15 |
| 7,578,494 B2 | * | 8/2009 | Mitsumata et al. ...... 251/129.15 |
| 7,581,302 B2 | * | 9/2009 | Tyler ............................... 29/557 |
| 7,661,654 B2 | * | 2/2010 | Okuda ......................... 251/366 |
| 8,205,858 B2 | * | 6/2012 | Mueller et al. ........... 251/129.18 |
| 2002/0113219 A1 | | 8/2002 | Rembold et al. |
| 2004/0084958 A1 | | 5/2004 | Ariki et al. |
| 2007/0181840 A1 | | 8/2007 | Mitsumata et al. |
| 2012/0001109 A1 | * | 1/2012 | Nanahara et al. ........ 251/129.15 |

FOREIGN PATENT DOCUMENTS

| CN | 101016950 | 8/2007 |
| JP | 01-150083 | 6/1989 |
| JP | 04-053209 | 2/1992 |
| JP | 2009-092187 | 4/2009 |

OTHER PUBLICATIONS

Office Action (1 page) dated Feb. 25, 2014, issued in corresponding Japanese Application No. 2012-243912 and English translation (2 pages).
Chinese Examination Report dated Aug. 26, 2014 in Chinese Application No. 201310016864.8.

* cited by examiner

*Primary Examiner* — Matthew W Jellett
(74) *Attorney, Agent, or Firm* — Nixon & Vanderhye P.C.

(57) ABSTRACT

A press-fit space is formed between a hole end wall portion of a stator core and a closing end wall portion of a stopper, which are axially opposed to each other in a press-fit hole of the stator core. At least one of the hole end wall portion of the stator core and the closing end wall portion of the stopper, which are axially opposed to each other, has a recess that increases a volume of the press-fit space formed between the hole end wall portion of the stator core and the closing end wall portion of the stopper.

6 Claims, 6 Drawing Sheets

SOLENOID ACTUATOR

CROSS REFERENCE TO RELATED APPLICATION

This application is based on and incorporates herein by reference Japanese Patent Application No. 2012-006264 filed on Jan. 16, 2012 and Japanese Patent Application No. 2012-243912 filed on Nov. 5, 2012.

TECHNICAL FIELD

The present disclosure relates to a solenoid actuator.

BACKGROUND

For example, JP2007-211842A (corresponding to US2007/0181840A1) teaches a solenoid actuator that includes a stopper, which is received in a receiving hole of a stator core. The stopper includes a large diameter segment and a shaft segment. One end surface of the large diameter segment is supported by a wall of the stator core in the receiving hole. The shaft segment axially extends from the other end surface of the large diameter segment and has an outer diameter, which is smaller than an outer diameter of the large diameter segment. The shaft segment is abuttable against a movable member (an armature of the solenoid actuator or a member that is moved integrally with the armature) to limit a slide position of the movable member, i.e., a maximum lift position of the movable member. An inner peripheral part of a return spring, which is formed as a compression coil spring, is supported by an outer peripheral part of the shaft segment of the stopper in the receiving hole of the stator core. One end of the return spring is held by the other end surface of the large diameter segment, and the other end of the return spring is held by the movable member to urge the movable member away from the stator core. The return spring is supported by the stopper in a manner that limits contact of the return spring to an inner peripheral wall of the receiving hole of the stator core. Therefore, it is possible to avoid generation of worn debris caused by frictional contact between the return spring and the inner peripheral wall of the receiving hole of the stator core. Thus, it is possible to avoid malfunction of the solenoid actuator caused by the debris that are caught by a movable component of the solenoid actuator.

However, in JP2007-211842A (corresponding to US2007/0181840A1), the stopper is not securely positioned relative to the stator core, so that the maximum lift position of the movable member may possible change during an operation of the solenoid actuator. In order to address such a disadvantage, it is conceivable to modify the solenoid actuator of JP2007-211842A (corresponding to US2007/0181840A1). Specifically, the solenoid actuator of JP2007-211842A (corresponding to US2007/0181840A1) may be modified in a manner shown in FIGS. 7A to 8.

In the solenoid actuator shown in FIGS. 7A to 8, a stopper 111 includes a large diameter segment 111a and a shaft segment 111b. The large diameter segment 111a is press-fitted into a press-fit hole 100 of a stator core 109. The shaft segment 111b has an outer diameter that is smaller than an outer diameter of the large diameter segment 111a. The shaft segment 111b is abuttable against a movable member (an armature of the solenoid actuator or a member that is moved integrally with the armature).

The stopper 111 limits a slide position of the movable member. In order to eliminate an operational error caused by a positioning error of the movable member, the stopper 111 is press-fitted into the press-fit hole 100 until the stopper 111 contacts a bottom end surface X1 of the press-fit hole 100.

In this instance, a press-fit space S1 is formed between the bottom end surface X1 of the press-fit hole 100 and a closing surface Y1 of the stopper 111, which are opposed to each other in an axial direction of the press-fit hole 100. A volume ratio of this press-fit space S1, which is obtained by dividing a volume of the press-fit space S1 at the time of starting the press-fitting of the stopper 111 into the press-fit hole 100 by the volume of the press-fit space S1 after the press-fitting of the stopper 111 into the press-fit hole 100, is substantially large.

When this volume ratio is large, the stopper 111 may be forcefully removed from the press-fit hole 100 by a pressure of the compressed air in the press-fit space S1.

In order to limit the forceful removal of the stopper 111, a breathing hole A may be formed in a portion of the stopper 111 (more specifically, the large diameter segment 111a), as shown in FIGS. 7A to 8. The breathing hole A releases the air, which is compressed in the press-fit space S at the time of press-fitting the stopper 111 into the press-fit hole 100, to the outside of the press-fit space S1.

However, burrs (debris) B, which are formed at the time of press-fitting the stopper 111 into the press-fit hole 100, may possibly remain in the breathing hole A. The burrs B may possibly be expelled from the breathing hole A and may possibly be caught by a movable portion (e.g., a sliding portion) of the solenoid actuator to cause functional loss during the service period of the solenoid actuator (the period of using the solenoid actuator).

Furthermore, the breathing hole A is formed at a location, which is eccentric relative to the shaft segment 111b, i.e., is radially displaced from the shaft segment 111b. Thereby, an inner diameter of the breathing hole A is very small. Thus, the processing costs of the breathing hole A may be disadvantageously increased.

SUMMARY

The present disclosure is made in view of the above disadvantages. According to the present disclosure, there is provided a solenoid actuator, which includes a stator core, a movable member and a stopper. The stator core has a press-fit hole that is recessed in the stator core. The press-fit hole is closed by a hole end wall portion of the stator core at one axial end of the press-fit hole, which is opposite from an opening end of the press-fit hole. The movable member is axially reciprocatable relative to the stator core. The stopper is press-fitted into the press-fit hole through the opening end of the press-fit hole. The stopper limits movement of the movable member on an axial side of the stopper, which is axially opposite from the hole end wall portion of the stator core. A press-fit space is formed between the hole end wall portion of the stator core and a closing end wall portion of the stopper, which are axially opposed to each other in the press-fit hole and seals the press-fit space from an outside of the press-fit space. At least one recess is formed in at least one of the hole end wall portion of the stator core and the closing end wall portion of the stopper, which are axially opposed to each other, to increase a volume of the press-fit space formed between the hole end wall portion of the stator core and the closing end wall portion of the stopper.

BRIEF DESCRIPTION OF THE DRAWINGS

The drawings described herein are for illustration purposes only and are not intended to limit the scope of the present disclosure in any way.

DETAILED DESCRIPTION

Figure 1:
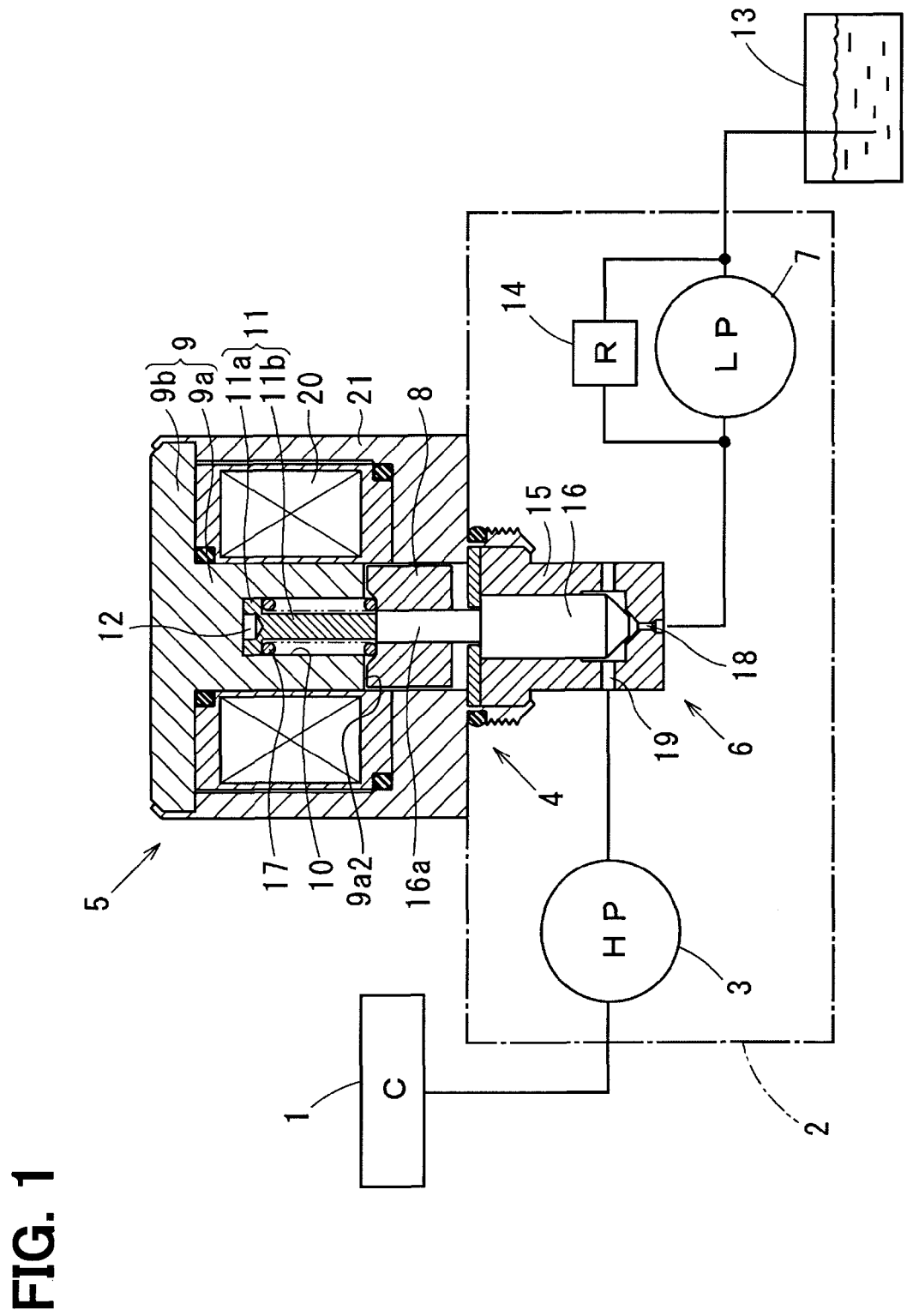
FIG. 1 is a schematic diagram of a common rail system, showing a cross-section of a pressure control valve (PCV) according to a first embodiment of the present disclosure.

Hereinafter, various embodiments of the present disclosure, in each of which the principle of the present disclosure is implemented in a solenoid valve of a supply pump, will be described with reference to the accompanying drawings. The following embodiments are mere examples of the present disclosure, and the present disclosure is not limited to the following embodiments.

First Embodiment

A first embodiment of the present disclosure will be described with reference to FIGS. 1 to 5C.

A common rail system, which is installed to a diesel engine (a compression-ignition internal combustion engine), includes a plurality of injectors (not shown), a common rail 1 and a supply pump 2. The injectors receive fuel (e.g., light oil, alcohol fuel), which is compressed to a high pressure, from the common rail 1, and the injectors inject the received fuel at the engine. The common rail 1 stores the high pressure fuel to be supplied to the respective injectors. The supply pump 2 pumps the high pressure fuel toward the common rail 1.

The supply pump 2 includes a feed pump (a low pressure pump) 7, a high pressure pump 3, a regulate valve 14 and a pressure control valve (PCV) 4. The feed pump 7 draws fuel, which is stored in a fuel tank 13. The high pressure pump 3 compresses the fuel, which is pumped out of the fuel tank 13 by the feed pump 7, to the high pressure and discharges the high pressure fuel toward the common rail 1. The regulate valve 14 maintains a constant pressure of the fuel supplied from the feed pump 7 toward the high pressure pump 3. The PCV 4 regulates a quantity of the fuel, which is supplied from the feed pump 7 to the high pressure pump 3. In other words, the PCV 4 is a fuel metering valve that adjusts a quantity of the fuel supplied to the high pressure pump 3, which pumps the high pressure fuel toward the common rail 1 that stores the high pressure fuel.

The PCV 4 includes a valve 6 and a solenoid actuator 5. The valve 6 opens and closes a fuel passage that conducts the fuel, the pressure of which is regulated by the regulate valve 14, toward the high pressure pump 3. The solenoid actuator 5 drives the valve 6.

Specifically, the PCV 4 is a solenoid valve of a normally closed type, which closes the fuel passage with the valve 6 at the time of stopping the supply of the electric power to the solenoid actuator 5.

Hereinafter, the upper side of FIG. 1 will be referred to as an upper side (a top side) of the PCV 4, and the lower side of FIG. 1 will be referred to as a lower side (a bottom side) of the PCV 4. The top-to-bottom direction of the present embodiment is merely used for the descriptive purpose and is not related to the actual installation direction of the PCV 4. That is, the top-to-bottom direction of the PCV 4 of the present embodiment is not limited to any particular direction.

The valve 6 includes a valve housing 15 and a valve element 16. The valve housing 15 is configured into a cup-shaped body having a peripheral wall and a bottom wall. The valve element 16 is supported in the valve housing 15 in an axially movable manner to enable the movement (reciprocation) of the valve element 16 in the top-to-bottom direction, i.e., the axial direction.

The valve element 16 is urged downward by a return spring 17, which is placed in the solenoid actuator 5. A conical portion of the valve element 16, which is located in a lower end of the valve element 16, is seatable against a valve seat formed in the valve housing 15 (more specifically, the bottom wall of the valve housing 15).

A fuel inlet 18 and a fuel outlet 19 are formed in the valve housing 15.

The fuel inlet 18 is a fuel passage hole, which is connected to an upstream side part (a feed pump 7 side part) of the fuel passage. The fuel inlet 18 is formed in a center of the valve seat of the valve housing 15. When the valve element 16 is seated against the valve seat of the valve housing 15, the fuel inlet 18 is closed.

The fuel outlet 19 is a fuel passage hole that is communicated to the fuel inlet 18 when the valve element 16 is lifted away from the valve seat of the valve housing 15. The fuel outlet 19 is connected to a downstream side part (a high pressure pump 3 side part) of the fuel passage.

The solenoid actuator 5 includes a coil 20, an armature (plunger) 8, a stator core 9, a solenoid housing 21, a stopper 11 and the return spring 17. The coil 20 generates a magnetic force when the coil 20 is supplied with the electric power, i.e., is energized. The armature 8 is supported in a movable manner (reciprocatable manner) to move in the top-to-bottom direction (the axial direction). That is, the armature 8 is reciprocatable (i.e., is adapted to reciprocate) in the axial direction relative to the stator core 9. The stator core 9 magnetically attracts the armature 8 toward the upper side by the magnetic force generated from the coil 20. The solenoid housing 21 functions as a yoke that covers the coil 20. The solenoid housing 21 also functions to conduct a magnetic flux, which is generated upon energization of the coil 20, relative to an outer peripheral surface of the armature 8 to form a magnetic circuit. The stopper 11 limits the maximum amount of lift of a movable member (the armature 8 and a member, such as a shaft 16a, which are integrally movable). The return spring 17 urges the armature 8 toward the lower side.

Similar to the stator core 9 and the solenoid housing 21, the armature 8 is made of a magnetic metal (e.g., a ferromagnetic material, such as iron). The armature 8 is configured into a generally cylindrical body that is slidable in the top-to-bottom direction.

The shaft 16a, which extends upward from the valve element 16, is fixed coaxially to the armature 8, so that the armature 8 and the valve element 16 are integrally movable, i.e., integrally reciprocatable in the top-to-bottom direction.

As discussed above, the stator core 9 is made of the magnetic material (e.g., the ferromagnetic material, such as iron). The stator core 9 includes a magnetically attracting core 9a and a cover 9b, which are integrally formed. The magnetically attracting core 9a is configured into a generally cylindrical body. The magnetically attracting core 9a has an axial end 9a2, which is axially opposite from the cover 9b. The axial end 9a2 of the magnetically attracting core 9a is axially opposed to a top surface of the armature 8. The cover 9b closes an upper end opening of a solenoid housing 21, which is configured into a cup-shaped body, so that the cover 9b is magnetically connected to the solenoid housing 21.

Figure 3:
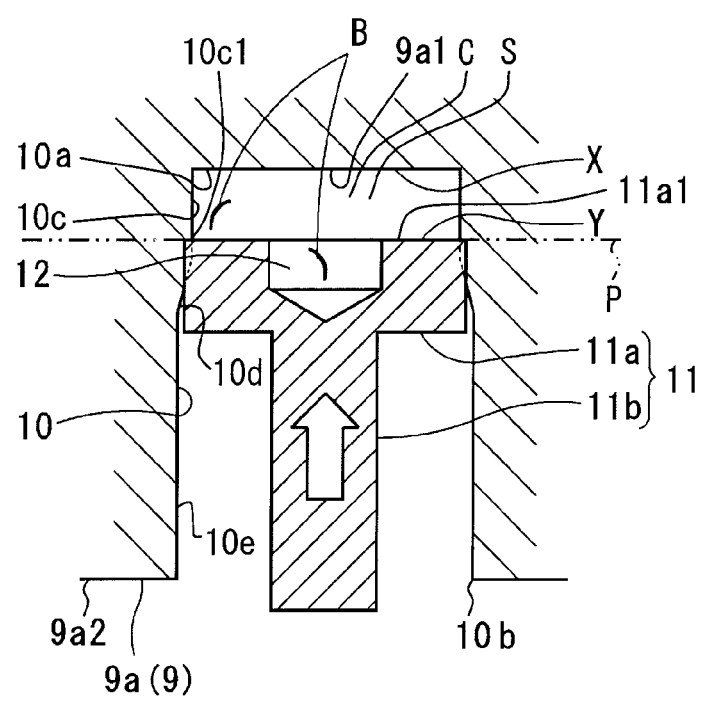
FIG. 3 is a schematic descriptive view showing an operation of press-fitting the stopper into a press-fit hole of a stator core according to the first embodiment.

As best seen in FIG. 3, the magnetically attracting core 9a of the stator core 9 has a press-fit hole 10 that is axially upwardly recessed in the axial end 9a2 of the magnetically attracting core 9a. The press-fit hole 10 is closed by a hole end wall portion 9a1 of the magnetically attracting core 9a at one axial end (an upper axial end in FIG. 3), i.e., a bottom end 10a of the press-fit hole 10. The bottom end 10a of the press-fit hole 10 is axially opposite from an opening end (a lower axial end in FIG. 3) 10b of the press-fit hole 10 located in the axial end 9a2 of the magnetically attracting core 9a. The hole end wall portion 9a1 of the magnetically attracting core 9a forms a bottom end surface X of the press-fit hole 10. The stopper 11 is press-fitted into the press-fit hole 10 to seal a press-fit space S with a closing surface Y formed in a closing end wall portion 11a1 of a large diameter segment 11a of the stopper 11. In the present embodiment, the bottom end surface X of the press-fit hole 10 serves as a planar surface section of the hole end wall portion 9a1 and extends in a direction, which is generally perpendicular an axis of the press-fit hole 10. Furthermore, the closing surface Y of the stopper 11 (more specifically, a planar section of the closing surface Y, which is other than the recess 12) serves as a planar surface section of the closing end wall portion 11a1 and extends in a direction, which is generally perpendicular to the axis of the press-fit hole 10. Furthermore, as discussed above, the stopper 11 limits a maximum lift position of the movable member (the armature 8 and the member, such as the shaft 16a, which are integrally movable). That is, the stopper 11 limits movement of the movable member on the lower axial side of the stopper 11, which is axially opposite from the hole end wall portion 9a1 of the stator core.

The press-fit hole 10 can be defined as a blind hole that extends upward from the axial end 9a2 of the magnetically attracting core 9a along a central axis of the magnetically attracting core 9a. An inner diameter of a bottom end region (also simply referred to as an end region) 10c of the press-fit hole 10, which axially extends from the bottom end 10a toward the opening end 10b for a predetermined distance, is made smaller than an inner diameter of the rest of the press-fit hole 10 to provide a press-fitting margin for press-fitting the stopper 11 into the press-fit hole 10 (more specifically, the bottom end region 10c). Furthermore, the inner diameter of the bottom end region 10c of the press-fit hole 10 is generally constant along an entire axial extent of the bottom end region 10c. In order to enable smooth press-fitting of the stopper 11 (more specifically, the large diameter segment 11a) into the bottom end region 10c, an inner diameter of an opening side region 10e located adjacent to the opening end 10b in the press-fit hole 10 is made larger than the inner diameter of the bottom end region 10c. Also, a tapered region 10d is axially placed between the opening side region 10e and the bottom end region 10c in the press-fit hole 10. The tapered region 10d has a progressively decreasing inner diameter, which progressively decreases from the opening side region 10e to the bottom end region 10c toward the bottom end surface X.

The inner diameter of the bottom end region 10c of the press-fit hole 10 is made slightly smaller than an outer diameter of the stopper 11 (more specifically, an outer diameter of the large diameter segment 11a of the stopper 11). The inner diameter of the opening side region 10e is made slightly larger than the outer diameter of the stopper 11 (more specifically, the outer diameter of the large diameter segment 11a).

The stopper 11 has the large diameter segment 11a and a shaft segment 11b. The large diameter segment 11a is configured into a generally circular disk body that is press-fitted into the press-fit hole 10 (more specifically, the bottom end region 10c). The shaft segment 11b extends downward from the large diameter segment 11a along the central axis of the large diameter segment 11a. The shaft segment 11b is abuttable against the upper end surface of the movable member (the shaft 16a or the armature 8).

The shaft segment 11b functions as a lift limiting means for limiting the maximum lift position of the movable member (e.g., the armature 8). The shaft segment 11b also functions as a supporting means for supporting the return spring 17.

Specifically, with reference to FIG. 1, the return spring 17 of the present embodiment is a compression coil spring, which axially urges the armature 8 in a direction away from the stopper 11 and the stator core 9 (in a direction toward the lower side). The return spring 17 is fitted to an outer peripheral part of the shaft segment 11b, so that the outer peripheral part of the shaft segment 11b supports an inner peripheral part of the return spring 17 and thereby limits tilting of the return spring 17 relative to the central axis of the stopper 11. One end of the return spring 17 is held by an end surface of the large diameter segment 11a, which is axially opposite from the hole end wall portion 9a1, and the other end of the return spring 17 is held by the movable member (more specifically, the armature 8) to urge the movable member away from the stator core 9. The return spring 17 may be supported by the stopper 11 in a manner that limits contact of the return spring 17 to an inner peripheral wall of the press-fit hole 10. Alternatively, the return spring 17 may be supported by the stopper 11 in a manner that results in contact of the return spring 17 to the inner peripheral wall of the press-fit hole 10, if desired. In the drawings, the return spring 17 is indicated only in FIG. 1 and is not indicated in the rest of the drawings for the sake of simplicity.

As discussed above with reference to FIG. 3, the press-fit space S is formed between the hole end wall portion 9a1 of the stator core 9 (the bottom end surface X of the press-fit hole 10) and the closing end wall portion 11a1 of the stopper 11 (the closing surface Y of the stopper 11), which are axially opposed to each other in the press-fit hole 10 and seals the press-fit space S from an outside of the press-fit space S.

The stopper 11 limits the maximum lift position of the movable member, as discussed above. Therefore, in order to avoid generation of an operational error caused by a positioning error of the movable member, the stopper 11 is press-fitted into the press-fit hole 10 until the stopper 11 contacts the hole end wall portion 9a1 of the stator core 9 (the bottom end surface X) that is an upper end surface of the press-fit hole 10 in FIG. 1.

Here, a volume ratio of the press-fit space S is defined as a ratio obtained by dividing the volume of the press-fit space S at the time of starting the press-fitting of the stopper 11 into the press-fit hole 10 by the volume of the press-fit space S after the press-fitting of the stopper 11 into the press-fit hole 10. When the volume ratio of the press-fit space S is large, the stopper 11 may be forcefully removed from the press-fit hole 10 by a pressure of the compressed air that is present in the press-fit space S and is compressed by the press-fitting of the stopper 11 into the press-fit hole 10.

In order to avoid the above disadvantage of forceful removal of the stopper 11 from the press-fit hole 10, according to the present embodiment, a recess 12 is formed in at least one of the hole end wall portion 9a1 of the stator core 9 (the bottom end surface X) and the closing end wall portion 11a1 (the closing surface Y) of the stopper 11 to increase the volume of the press-fit space S that is axially held between the hole end wall portion 9a1 (the bottom end surface X) and the closing end wall portion 11a1 (the closing surface Y) of the stopper 11.

Figure 2A:
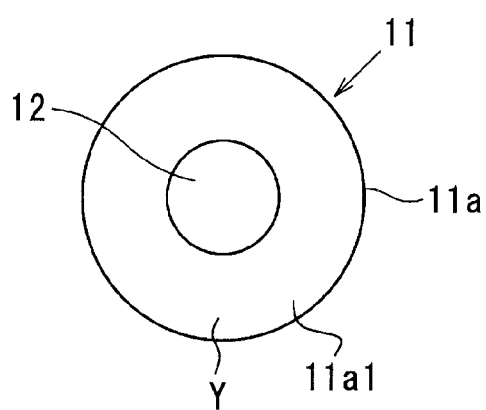
FIG. 2A is an axial end view of a stopper of the first embodiment.
Figure 2B:
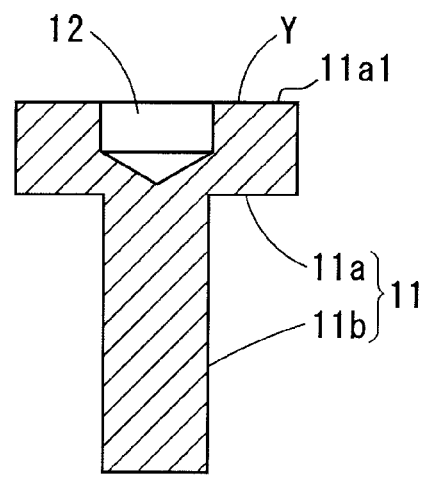
FIG. 2B is a longitudinal cross-sectional view of the stopper of FIG. 2A.

As a specific example, as shown in FIGS. 2A and 2B, the recess 12 of the first embodiment is formed as a recess that is axially recessed in the upper end surface of the stopper 11, i.e., the closing surface Y of the large diameter segment 11a by, for example, a cutting process using a drill bit.

The configuration of the recess 12 is not limited to any particular one and may possibly have any appropriate configuration, such as one selected from various configurations shown in FIGS. 4A to 4D.

Figure 4A:
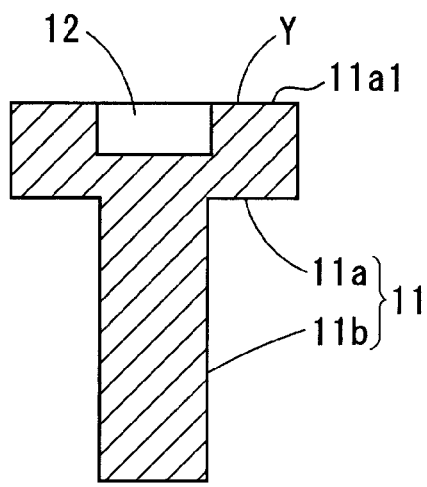
FIGS. 4A to 4D are longitudinal cross-sectional views showing variations of a recess of the stopper according to the first embodiment.
Figure 4B:
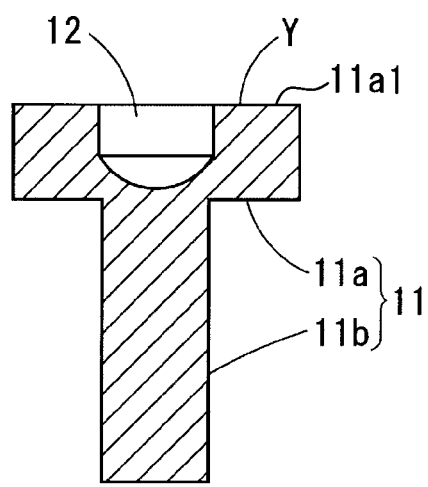
Figure 4C:
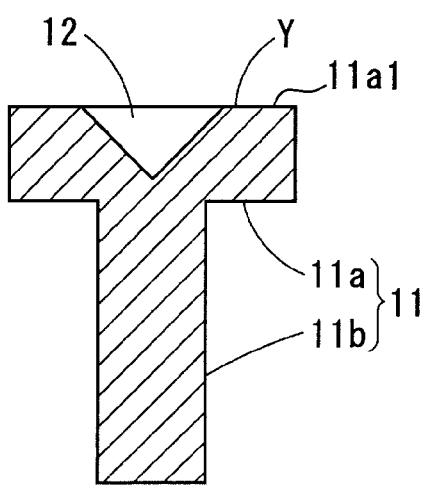
Figure 4D:
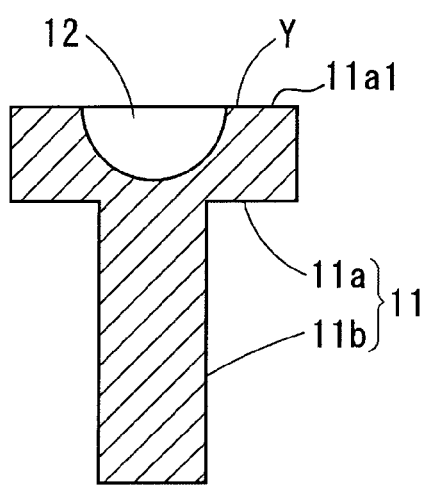

Specifically, FIG. 4A shows the recess 12, which is formed as a cylindrical hole (having a rectangular longitudinal cross-section taken along the axis of the stopper 11). FIG. 4B shows the recess 12 that is formed by a combination of a cylindrical hole, which extends in the top-to-bottom direction, and a semispherical bottom. FIG. 4C shows the recess 12, which is formed to have a conical bottom portion (having a triangular longitudinal cross-section taken along the axis of the stopper 11). FIG. 4D shows the recess 12, which is formed to have a semispherical bottom (having an arcuate longitudinal cross-section taken along the axis of the stopper 11).

Furthermore, the process of forming the recess 12 is not limited to the cutting process, and any other process or technique may be used to form the recess 12.

As an example of such a process of forming the recess 12 may include a technique of plastic deformation (e.g., a forging process).

The recess 12 is provided to maintain the relatively low pressure of the compressed air in the press-fit space S after the press-fitting of the stopper 11 into the press-fit hole 10 or to limit an excessive increase of the pressure of the compressed air in the press-fit space S after the press-fitting of the stopper 11 into the press-fit hole 10. Therefore, the recess 12 limits the forceful removal of the stopper 11 from the press-fit hole 10 caused by the pressure of the compressed air, which is compressed by the press-fitting of the stopper 11 into the press-fit hole 10.

As a result, the volume of the press-fit hole 10 is set to a corresponding volume that limits the forceful removal of the stopper 11 from the press-fit hole 10 caused by the pressure of the compressed air of the press-fit space S that is compressed by the press-fitting of the stopper 11 into the press-fit hole 10.

Figure 5A:
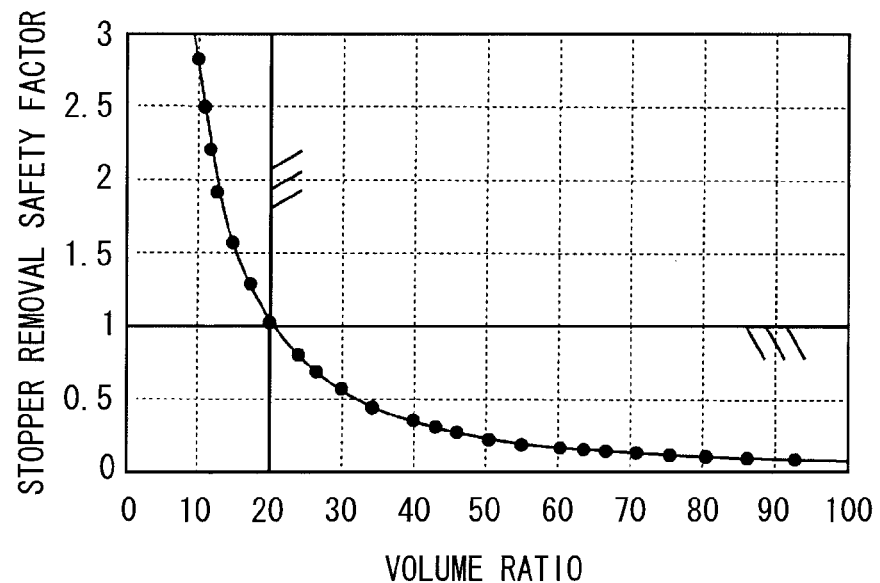
FIG. 5A is a diagram showing a relationship between a volume ratio and a stopper removal safety factor.

FIG. 5A shows a relationship between "the volume ratio" of the compressed air in the press-fit space S, which is compressed by the press-fitting of the stopper 11, and "a stopper removal safety factor" of the stopper 11.

Figure 5B:
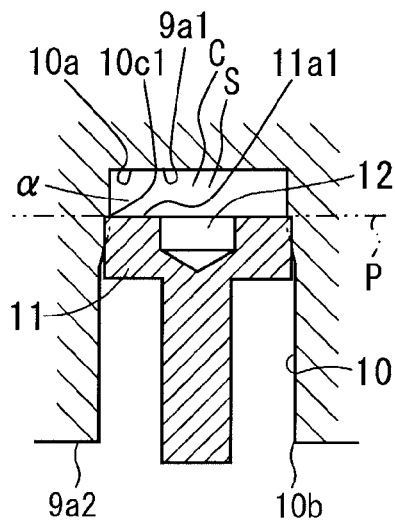
FIG. 5B is a schematic diagram showing a volume of a press-fit space at the time of starting the press-fitting of the stopper into the press-fit hole according to the first embodiment.
Figure 5C:
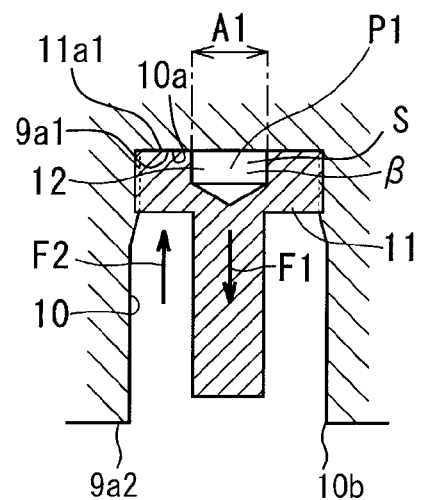
FIG. 5C is a schematic diagram showing the volume of the press-fit space after the press-fitting of the stopper into the press-fit hole according to the first embodiment.

FIG. 5B is a schematic diagram showing the volume α of the press-fit space S immediately before the press-fitting of the stopper 11 into the press-fit hole 10 (more specifically the bottom end region 10c of the press-fit hole 10), i.e., the volume α of the press-fit space S at the time of starting the press-fitting of the stopper 11 into the press-fit hole 10. FIG. 5C is a schematic diagram showing the volume β of the press-fit space S after the press-fitting of the stopper 11 into the press-fit hole 10 (i.e., after completion of the press-fitting of the stopper 11 into the press-fit hole 10). With reference to FIGS. 5B and 5C, the volume ratio is obtained by dividing the volume α of the press-fit space S at the time of starting the press-fitting of the stopper 11 into the press-fit hole 10 by the volume β of the press-fit space S after the press-fitting of the stopper 11 into the press-fit hole 10. The removal safety factor is obtained by diving an unmating force (unmating load) F2 by a force F1 generated by the internal pressure in the recess 12 (i.e., the internal pressure in the press-fit space S formed by the recess 12 in FIG. 5C).

Here, it should be noted that the volume α of the press-fit space S at the time of starting the press-fitting of the stopper 11 into the press-fit hole 10 (more specifically the bottom end region 10c of the press-fit hole 10) is generally equal to a sum of a volume of the recess 12 and a volume of an imaginary cylindrical space C (see, for example, FIG. 3) that is defined in the bottom end region 10c. The imaginary cylindrical space C is defined, i.e., is formed by an imaginary plane of the planar surface section (the bottom end surface X) of the hole end wall portion 9a1, a cylindrical inner peripheral wall surface of the bottom end region 10c and an imaginary plane P at an opening-side end 10c1 of the bottom end region 10c. The opening-side end 10c1 of the bottom end region 10c is located on an axial side where the opening end 10b of the press-fit hole 10 is located. The imaginary plane P at the opening-side end 10c1 of the bottom end region 10c extends through the opening-side end 10c1 of the bottom end region 10c in a direction that is generally perpendicular to the axis of the press-fit hole 10. Furthermore, the volume of the recess 12 is a volume of a space, which is defined by an inner surface of the recess 12 and an imaginary plane of the closing surface Y.

Referring back to FIG. 5C, the unmating force (the unmating load) F2 is a force or a load that is determined by the press-fitting load of the stopper 11. The force F1, which is generated by the internal pressure developed in the recess 12, i.e., the press-fit space S is obtained by multiplying "an internal pressure P1 of the recess 12 after the press-fitting of the stopper 11 into the press-fit hole 10" by "a cross-sectional area A1 of the recess 12."

As shown in FIG. 5A, when the volume ratio is equal to or less than 20, the removal safety factor of 1 or higher can be ensured. Therefore, the volume of the recess 12 is set to satisfy the condition of that the volume ratio between "the volume a of the press-fit space S at the time of starting the press-fitting of the stopper 11 into the press-fit hole 10" and "the volume β of the press-fit space S after the press-fitting of the stopper 11 into the press-fit hole 10" is equal to or less than 20.

Specifically, in this embodiment, the volume of the recess 12 is determined, i.e., is set to ensure that the removal safety factor is equal to or greater than 3, more preferably the removal safety factor is equal to or greater than 5.

Now, the advantages of the first embodiment will be described.

In the PCV 4 of the present embodiment, the recess 12, which increases the volume of the press-fit space S, is formed in the closing end wall portion 11a1 (the closing surface Y) of the stopper 11.

With this recess 12, the volume of the press-fit space S after the press-fitting of the stopper 11 into the press-fit hole 10 can be increased, so that the volume ratio can be reduced. Thereby, even when the press-fit space S is formed as the closed space (sealed space), the compression of the air in the press-fit space S can be limited. Thereby, it is possible to avoid or minimize the forceful removal of the stopper 11 from the press-fit hole 10 that would be caused by the pressure of the compressed air.

Because of the provision of the press-fit space S as the closed space, even when burrs (debris) B are generated at the time of press-fitting the stopper 11 into the press-fit hole 10, the burrs B can be sealed into the press-fit space S, which is formed as the sealed space. That is, it is possible to eliminate the possibility of that the burrs B is caught by a movable portion(s) of the PCV 4. Therefore, it is possible to avoid the risk of generating a functional loss of the PCV 4, which is caused by the burrs B. As a result, the reliability of the PCV 4 can be improved, and thereby the reliability of the supply pump 2 can be improved.

Furthermore, the recess 12 is provided to increase the volume of the press-fit space S. Therefore, the diameter A1 of the recess 12 is set to be larger than a diameter of the breathing hole A of the related art (see FIGS. 7A to 9). Thereby, the recess 12 can be more easily formed in comparison to the breathing hole A1 of the related art. Thus, the processing costs can be reduced in comparison to the related art of forming the breathing hole A.

That is, according to the present embodiment, the reliability of the PCV 4 can be improved, and the costs of the PCV 4 can be limited.

Second Embodiment

Figure 6:
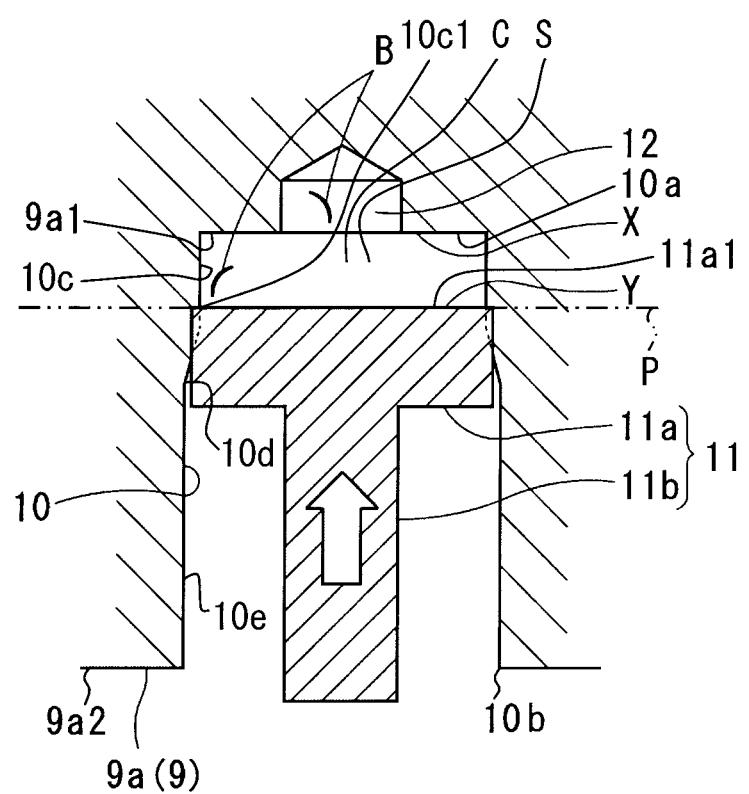
FIG. 6 is a longitudinal cross-sectional view showing a recess formed in a hole end wall portion of a stator core, which forms a bottom end surface of a press-fit hole, according to a second embodiment of the present disclosure.
Figure 7A:
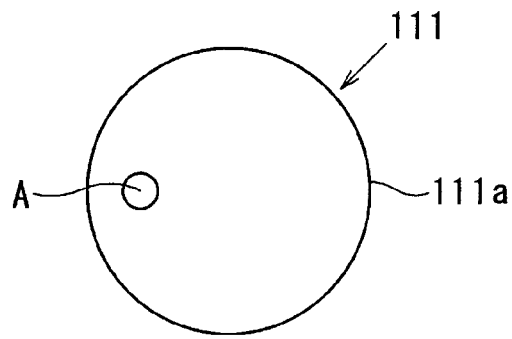
FIG. 7A is an axial end view of a stopper according to a related art.
Figure 7B:
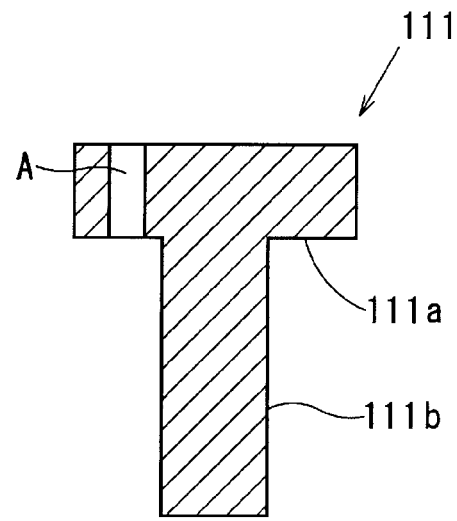
FIG. 7B is a longitudinal cross-sectional view of the stopper of FIG. 7A.
Figure 8:
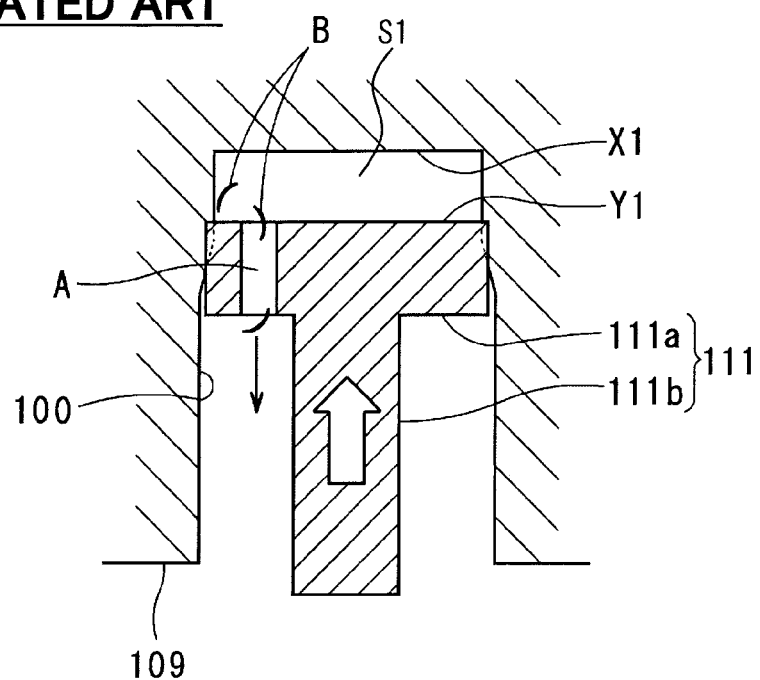
FIG. 8 is a schematic descriptive view showing an operation of press-fitting the stopper of FIGS. 7A and 7B into a press-fit hole of a stator core according to the related art.

A second embodiment of the present disclosure will be described with reference to FIG. 6. In the second embodiment, the components, which are similar to those of the first embodiment, will be indicated by the same reference numerals.

In the first embodiment, the recess 12 is formed in the closing end wall portion 11a1 (the closing surface Y) of the stopper 11.

In contrast, in the second embodiment, the recess 12 is formed in the hole end wall portion 9a1 of the stator core 9 (the bottom end surface X of the press-fit hole 10).

Even with the above construction of the second embodiment, the advantages similar to those of the first embodiment can be achieved. Furthermore, in the second embodiment, the bottom end surface X of the press-fit hole 10 (more specifically, a planar section of the bottom end surface X, which is other than the recess 12) serves as the planar surface section of the hole end wall portion 9a1 and extends in the direction, which is generally perpendicular the axis of the press-fit hole 10, to form the imaginary cylindrical space C in cooperation with the cylindrical inner peripheral wall surface of the bottom end region 10c and the imaginary plane P. Furthermore, the volume of the recess 12 is a volume of a space, which is defined by an inner surface of the recess 12 and the imaginary plane of the bottom end surface X (more specifically, the planar surface section of the bottom end surface X, which is other than the recess 12).

Now, modifications of the above embodiments will be described.

In the above embodiments, the recess 12 is formed in one of the closing end wall portion 11a1 (the closing surface Y) of the stopper 11 and the hole end wall portion 9a1 of the stator core 9 (the bottom end surface X of the press-fit hole 10). Alternatively, the recess 12 may be formed in both of the closing end wall portion 11a1 (the closing surface Y) of the stopper 11 and the hole end wall portion 9a1 of the stator core 9 (the bottom end surface X of the press-fit hole 10). When the recess 12 is formed in both of the closing end wall portion 11a1 (the closing surface Y) of the stopper 11 and the hole end wall portion 9a1 of the stator core 9 (the bottom end surface X of the press-fit hole 10), the volume ratio can be easily reduced, and thereby the removal safety factor can be improved. Furthermore, the number of the recess(es) 12 formed in each of the closing end wall portion 11a1 (the closing surface Y) of the stopper 11 and/or the hole end wall portion 9a1 of the stator core 9 (the bottom end surface X of the press-fit hole 10) is not limited to one and may be increased to two or more. In other words, it is only required to provide at least one recess 12 in the closing end wall portion 11a1 (the closing surface Y) of the stopper 11 and the hole end wall portion 9a1 of the stator core 9 (the bottom end surface X of the press-fit hole 10). Even in such a case, the volume ratio, which is obtained by dividing the sum of the volume of the imaginary cylindrical space C and the volume of the at least one recess 12 by the volume of the at least one recess 12 is equal to or less than 20 to achieve the advantages discussed in the first embodiment.

In the above embodiments, the principle of the present disclosure is applied to the PCV 4, which is installed in the supply pump 2 of the common rail system. Alternatively, the principle of the present disclosure may be applied to a solenoid value, which is used in a different application that is different from the PCV 4.

In the above embodiments, the principle of the present disclosure is applied to the solenoid valve (the PCV 4 in the above embodiments). However, a subject device, which is driven by the solenoid actuator 5, is not limited to the valve 6. That is, the solenoid actuator 5 of the present disclosure may be applied to a solenoid actuator, which is used in a different application that is different from the solenoid valve.

Additional advantages and modifications will readily occur to those skilled in the art. The present disclosure in its broader terms is therefore not limited to the specific details, representative apparatus, and illustrative examples shown and described.

What is claimed is:

1. A solenoid actuator comprising:
    a stator core, which has a press-fit hole that is recessed in the stator core, wherein the press-fit hole is closed by a hole end wall portion of the stator core at one axial end of the press-fit hole, which is opposite from an opening end of the press-fit hole;
    a movable member that is axially reciprocatable relative to the stator core; and
    a stopper that is press-fitted into the press-fit hole through the opening end of the press-fit hole, wherein:
    the stopper limits movement of the movable member on an axial side of the stopper, which is axially opposite from the hole end wall portion of the stator core;
    a press-fit space is formed between the hole end wall portion of the stator core and a closing end wall portion of the stopper, which are axially opposed to each other in the press-fit hole and seals the press-fit space from an outside of the press-fit space; and
    at least one recess is formed in the closing end wall portion of the stopper, which is axially opposed to the hole end wall portion of the stator core and axially contacts the hole end wall portion of the stator core, to increase a volume of the press-fit space formed between the hole end wall portion of the stator core and the closing end wall portion of the stopper.

2. The solenoid actuator according to claim 1, wherein:
the solenoid actuator drives a valve; and
the solenoid actuator cooperates with the valve to form a solenoid valve.

3. The solenoid actuator according to claim 2, wherein the solenoid valve is a fuel metering valve that adjusts a quantity of fuel supplied to a high pressure pump, which pumps high pressure fuel toward a common rail that stores the high pressure fuel.

4. The solenoid actuator according to claim 1, wherein:
the stopper has:
  a large diameter segment that is press-fitted into the press-fit hole; and
  a shaft segment that extends from the large diameter segment and is abuttable against the movable member, wherein the shaft segment has an outer diameter, which is smaller than an outer diameter of the large diameter segment; and
a return spring, which urges the movable member in a direction away from the stopper and is formed as a compression coil spring, is fitted to an outer peripheral part of the shaft segment, and the outer peripheral part of the shaft segment supports an inner peripheral part of the return spring.

5. The solenoid actuator according to claim 1, wherein a volume of the at least one recess is set such that a volume ratio, which is obtained by dividing a volume of the press-fit space before the press-fitting of the stopper into the press-fit hole by the volume of the press-fit space after the press-fitting of the stopper into the press-fit hole, is equal to or less than 20.

6. The solenoid actuator according to claim 1, wherein:
the press-fit hole has an end region that axially extends from the one axial end of the press-fit hole toward the opening end of the press-fit hole;
the end region has an inner diameter, and inner diameter of the end region is smaller than an inner diameter of the rest of the press-fit hole and is generally constant throughout an entire axial extent of the end region;
the stopper is press-fitted into the end region of the press-fit hole;
the hole end wall portion forms a planar surface section, which extends in a direction that is generally perpendicular to an axis of the press-fit hole;
the end region defines an imaginary cylindrical space that is formed by an imaginary plane of the planar surface section of the hole end wall portion, a cylindrical inner peripheral wall surface of the end region and an imaginary plane at an opening-side end of the end region, wherein the opening-side end of the end region is located on an axial side where the opening end of the press-fit hole is located, and the imaginary plane at the opening-side end of the end region extends through the opening-side end of the end region in a direction that is generally perpendicular to the axis of the press-fit hole; and
a volume ratio, which is obtained by dividing a sum of a volume of the imaginary cylindrical space and a volume of the at least one recess by the volume of the at least one recess, is equal to or less than 20.

* * * * *